3,772,274
PROCESS FOR PREPARING 2-(o-HYDROXY-
PHENYL)QUINAZOLINES
Ralph Benjamin Kaplan, Wilmington, Del., assignor to
E. I. du Pont de Nemours and Company, Wilmington,
Del.
No Drawing. Filed Dec. 23, 1970, Ser. No. 101,173
Int. Cl. C07d 51/48
U.S. Cl. 260—251 Q                           13 Claims

ABSTRACT OF THE DISCLOSURE

The process of preparing a 2-(o-hydroxyphenyl)quinazoline which comprises reacting an organic nitrile compound with an N-phenyl-o-oxybenzimidoyl chloride in the presence of a Friedel-Crafts catalyst at a temperature of from about 90° to about 160° C.

BACKGROUND OF THE INVENTION

(1) Field of the invention

The process of the present invention relates to the preparation of 2-(o-hydroxyphenyl)quinazolines. More specifically, the process of the present invention relates to the preparation of 2-(o-hydroxyphenyl)quinazolines by reacting an N-phenyl-2-oxybenzimidoyl chloride with an organic nitrile.

(2) Description of the prior art

Quinazolines of the type 2-phenyl-4-substituted quinazolines have been prepared by reacting N-phenylbenzimidoyl chloride with organic nitriles in the presence of Friedel-Crafts catalysts. In none of the prior art compounds or processes is the 2-phenyl group substituted by an o-hydroxy group. Such compounds are highly resistant to degradation by ultraviolet light and useful as light screens and photostabilizers.

In U.S. Pat. 3,637,693, processes for making 2-(o-hydroxyphenyl)quinazolines are disclosed. However, these processes are involved and costly.

The preparation of 2-(o-hydroxyphenyl)quinazolines by reacting an N-phenyl-2-oxybenzimidoyl chloride with an organic nitrile in view of the activity of the ortho hydroxy or oxygroup was unpredictable. It would be expected that, as indicated in Heterocyclic Compounds, vol. 6, edited by R. C. Elderfield (John Wiley & Sons, 1957) at pp. 568–9, in the reaction of N-phenyl-o-hydroxybenzimidoyl chloride that ring closure would involve the hydroxyl group.

It is an object of this invention to provide a new process for the preparation of 2-(o-hydroxyphenyl)quinazolines. It is also an object of this invention to provide a process for preparing 2-(o-hydroxyphenyl)quinazolines directly from an N-phenyl-2-oxybenzimidoyl chloride. These and other objects will be evident from the disclosure that follows.

SUMMARY OF THE INVENTION

Now in accordance with the invention it has surprisingly been found that 2-(o-hydroxyphenyl)quinazolines having an organic radical in the 4-position are prepared by the process which comprises reacting an N-phenyl-2-oxybenzimidoyl chloride, wherein the N-phenyl group has a phenyl nucleus directly attached to the nitrogen atom with the position ortho to the nitrogen attachment being unsubstituted, with an organic nitrile in the presence of a Friedel-Crafts catalyst.

Accordingly, a 2-(o-hydroxyphenyl)quinazoline of the formula

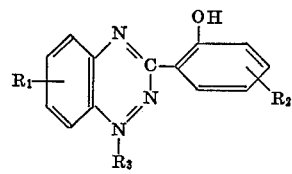

is prepared by reacting an organic nitrile of the formula $R_3CN$ with an N-phenyl-o-oxybenzimidoyl chloride of the formula

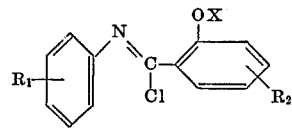

in the presence of a Friedel-Crafts catalyst.

In the above formulae $R_1$ is selected from the group consisting of hydrogen, halogen, alkyl of 1–16 carbon atoms cycloalkyl halogen substituted cycloalkyl, halogen substituted alkyl of 1–16 carbon atoms and alkoxy of 1–16 carbon atoms; $R_2$ is selected from the group consisting of hydrogen, alkyl of 1–16 carbon atoms cycloalkyl halogen substituted cycloalkyl, and halogen substituted alkyl of 1–16 carbon atoms; $R_3$ is selected from the group consisting of hydrocarbyls of 1–17 carbon atoms and substituted hydrocarbyl having substituents selected from the group consisting of halogen and alkoxy and X is selected from the group consisting of hydrogen and acyl of 2–4 carbon atoms. The term cycloalkyl is meant to include cycloalkyl groups such as cyclopentyl, cyclohexyl and cycloheptyl.

Thus when an N-phenyl-2-oxybenzimidoyl chloride selected from the group consisting of N-phenyl-2-hydroxy-benzimidoyl chlorides and N-phenyl-2-acyloxy-benzimidoyl chlorides is reacted with an organic nitrile represented by $R_3CN$ in the presence of a Friedel-Crafts catalyst such as an anhydrous metal halide, a 2-(o-hydroxyphenyl)quinazoline having an organic radical at the 4-position is prepared. The N-phenyl-2-oxybenzimidoyl chlorides of this invention are represented by the formula

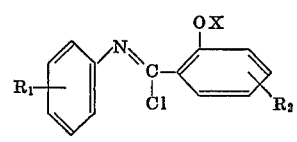

wherein $R_1$, $R_2$ and X are as defined above.

Representative examples of $R_1$ are hydrogen, fluorine, chlorine, bromine, iodine, methyl, ethyl, hexyl, nonyl, dodecyl, tridecyl, hexadecyl, $CF_3$—, $CF_3CH_2$— and

$CF_3CF_2CH_2CH_2$

Preferred examples of $R_1$ are radicals selected from the group consisting of hydrogen, chlorine, alkoxy of 1–4 carbon atoms, particularly methoxy, and alkyl of 1–4 carbon atoms, particularly methyl.

Representative examples of $R_2$ are hydrogen, methyl, ethyl, propyl, hexyl, octyl, tridecyl, hexadecyl, $CF_3$—, $CF_3CH_2$— and $CF_3CF_2CH_2CH_2$. Preferred examples of $R_2$ are hydrogen and alkyl having 1–4 carbon atoms, most preferably methyl.

Representative examples of X are hydrogen, acetyl, propionyl, butyryl and isobutyryl. The preferred groups for X are hydrogen or acetyl. In the reaction, where X is an acyl group, the acyl group hydrolyzes when water is added to the reacted mass resulting in the recovered compound having a hydrogen as X.

The N-phenyl-2-oxybenzimidoyl chloride of this invention may be unsubstituted or substituted on the phenyl nuclei provided the substituents do not interfere with the reaction. Noninterfering substituents include halogen, alkyl and alkoxy groups. Representative examples of N-phenyl-2-oxybenzimidoyl chlorides include N-phenyl-2-acetoxybenzimidoyl chloride,
N-phenyl-2-hydroxybenzimidoyl chloride,
N-(p-chlorophenyl)-2-hydroxy-3-methylbenzimidoyl chloride,
N-(p-chlorophenyl)-2-hydroxybenzimidoyl chloride,
N-(p-methoxyphenyl)-2-hydroxybenzimidoyl chloride,
N-(p-chlorophenyl)-2-acetoxybenzimidoyl chloride,
N-(p-methoxyphenyl)-2-acetoxybenzimidoyl chloride,
N-(p-ethoxyphenyl)-2-butyroxybenzimidoyl chloride,
N-(p-bromophenyl)-2-hydroxy-5-t-butyl-benzimidoyl chloride,
N-(3',4'-dichlorophenyl)-2-hydroxybenzimidoyl chloride,
N-(p-dodecylphenyl)-2-hydroxybenzimidoyl chloride,
N-[4'-(2''-ethylhexyl)phenyl]-2-hydroxybenzimidoyl chloride,
N-phenyl-2-hydroxy-4-butylbenzimidoyl chloride and
N-(p-hexadecyloxyphenyl)-2-hydroxybenzimidoyl chloride.

The N-phenyl-2-oxybenzimidoyl chlorides used in this reaction can be prepared by reacting an N-phenyl-2-oxybenzamide or a derivative thereof with equimolar amount of a halodehydrating agent, selected from the group consisting of thionyl chloride and phosphorus pentachloride at a temperature of 20°–200° C. until hydrogen chloride evolution ceases. Phosphorus pentachloride, the preferred agent, reacts according to the general reaction

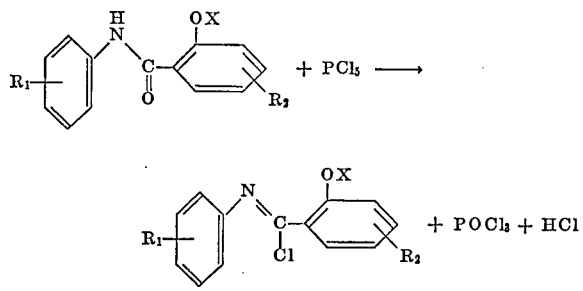

The N-phenyl-2-oxybenzamide or a derivative thereof may be reacted with the thionyl chloride or phosphorus pentachloride as indicated above and the reaction product contacted with the organic nitrile of this invention in the presence of a Friedel-Crafts catalyst and the 2-(o-hydroxyphenyl)quinazolines of this invention prepared in a direct one-step reaction.

An organic diluent may be conveniently used in the above reaction. These organic diluents may be benzene, monochlorobenzene, dichlorobenzene, xylene, tetrachloroethane, nitromethane and nitrobenzene. Hydrogen chloride is evolved in the reaction. The prosphoryl chloride and any excess phosphorus pentachloride are removed by distillation. The reaction product of the N-phenyl-2-oxybenzimidoyl chloride in the diluent may be used in the process of this invention.

The organic nitriles of this invention may be represented by the formula $R_3CN$ wherein $R_3$ is hydrocarbyl of 1–17 carbon atoms or substituted hydrocarbyl of 1–17 carbon atoms having substituents selected from the group consisting of halogen and alkoxy.

The hydrocarbyl radical is selected from the group consisting of saturated aliphatic hydrocarbon radicals, unsaturated aliphatic hydrocarbon radical, cycloaliphtic hydrocarbon radicals, phenyl substituted alkyl radicals, phenyl, and alkyl substituted phenyl radicals.

Representative examples of saturated aliphatic radicals include alkyl such as methyl, ethyl, tertiary butyl, n-pentyl, n-heptyl, n-nonyl, pentadecyl, and n-heptadecyl. Preferably, the alkyl radicals will contain 1 to about 9 carbon atoms.

Representative examples of unsaturated aliphatic hydrocarbon radicals include alkenyl radicals such as isopropenyl, n-pentenyl, isobutenyl, Δ-9,10-undecenyl, and Δ9,10-n-heptadecenyl. Preferably, the alkenyl radicals will contain from 1 to about 9 carbon atoms.

Representative examples of cycloaliphatic radicals include cyclopentyl, cyclohexyl, p-methylcyclohexyl, p-hexylcyclohexyl and p-decylcyclohexyl.

Representative examples of alkyl substituted phenyl radicals include phenylmethyl and diphenylmethyl.

Representative examples of alkyl substituted phenyl radicals include methylphenyl, dimethylphenyl, p-hexylphenyl, and decylphenyl.

The substituted hydrocarbyl having substituents selected from the group consisting of halogen and alkoxy will contain the hydrocarbyl radicals of 1–17 carbon atoms as illustrated herein. Halogen will include chlorine, bromine, fluorine and iodine. Alkoxy will include radicals of 1–6 carbon atoms. The preferred substituted hydrocarbyl radicals are $C_1$–$C_4$ alkoxyphenyls.

Representative examples of substituted hydrocarbyls having halogen substituents include 1-chloro-n-heptadecyl, $F(CF_2CF_2)_n(CH_2)_m$ wherein $m$ is 1 or 2 and $n$ is 1–7, 4-chlorophenyl, 3-chlorophenyl, 2-methyl-3-bromophenyl and chlorodimethylphenyl.

Representative examples of substituted hydrocarbyls having alkoxy substituents included methoxymethyl, 5-hexyloxy-n-phenyl, 2-hexyloxyethyl, hexyloxymethyl, 2-methoxyphenyl, 4-methoxyphenyl, 2-methyl-4-butoxyphenyl, 4-ethoxyphenyl and 2,4-dimethyl-3-dodecyloxyphenyl.

Representative nitriles that can be used in this invention include acetonitrile, methacrylonitrile, pivalonitrile, capronitrile, stearonitrile, benzonitrile, toluonitriles, xylonitriles, o-methoxybenzonitrile.

The Friedel-Crafts catalyst used in the process of this invention may be selected from anhydrous coordinating metal halides such as aluminum chloride, aluminum bromide, zinc chloride, stannic chloride, antimony pentachloride, titanium tetrachloride and ferric chloride. They are used in molar proportions at least equal to the amount of imidoyl chloride reactant in the process. Aluminum chloride is the preferred catalyst, however, for this process. The use of less than the recommended proportion of aluminum chloride results in lowered product formation.

The reaction of this process normally requires a temperature of at least 90° C. for it to proceed. The mixture of reactants should be fluid and stirrable at the reaction temperature. Conveniently a diluent may be used for the reaction. That diluent can simply be an excess of a reactant, such as of the usually cheaper nitrile. The diluent can be an additional organic compound which is liquid at the reaction temperature and which is inert to the reactants, to the catalyst and to any intermediate compounds involving the catalyst. The reaction can be carried out at temperatures as high as 160° C. However, the preferred reaction temperature range of this process is 100° to 110° C.

Among added organic diluents which are useful in this reaction are nitromethane, tetrachloroethane, nitrobenzene, monochlorobenzene, o-dichlorobenzene, benzene and xylene.

In preparing a reaction mixture for this process, the nitrile and the catalyst, in either order, are usually added to the imidoyl chloride. Moisture sensitivity of the imidoyl chloride makes it more practical this way. When catalyst is added to the imidoyl chloride, a heat rise occurs. If the mixture temperature is not above 40° C., the heat "kick" will probably not raise the temperature enough for quinazoline formation to proceed. When the reaction does proceed, hydrogen chloride is evolved. The reaction proceeds smoothly without difficult control of necessary heating.

The 2-(o-oxyphenyl)quinazolines are present in the reaction mixture as Friedel-Crafts catalyst complexes.

Recovery of the 2-(o-oxyphenyl)quinazoline is conveniently done by mixing water or ice into the reacted mass. The complex decomposes with heat evolution so some prior cooling of the reacted mass is advisable. At this point if a 2-(o-acyloxyphenyl)quinazoline had been produced, it has become hydrolyzed to a 2-(o-hydroxyphenyl)quinazoline by the added water. The quinazolines are insoluble in water and have limited solubility in the small amount of organic diluent normally used.

To isolate the 2-(o-hydroxyphenyl)quinazoline, the organic solvent may be steam distilled from the hydrolyzed mixture, the aqueous phase separated from the solids, and the solids extracted with an organic solvent. Alternatively, the aqueous phase with some added hydrochloric acid may be removed from the organic phase, and the organic phase is subsequently steam distilled or recrystallized according to general methods of the chemical art.

An especially effective method to isolate the 2-(o-hydroxyphenyl)quinazoline in very pure form is to steam distill off the organic solvent, add strong base to make the aqueous phase to pH at least 11 and stir at 40°–50° C. while maintaining that basicity. This method selectively hydrolyzes and dissolves all components except the desired 2-(o-hydroxyphenyl)quinazoline, which is recovered in a pure form.

In cases where the imidoyl chloride was used without separating the phosphoryl chloride which results from the reaction of the N-phenyl-2-oxybenzamide with phosphorus pentachloride, the isolation can be greatly simplified. The reacted mass can be steam distilled to remove organic diluents and then the stripped organic material can be filtered from the aqueous phase, which contains all inorganic material in solution. Alternatively, one may add sufficient water to the reaction mass to extract the inorganic material from it, remove the aqueous phase and strip organic diluents from the organic phase. After either alternate the above strong basic treatment can be used to produce the pure quinazoline compound.

The following examples further illustrate the invention.

The parts given, unless otherwise indicated, are parts by weight.

Nuclear magnetic resonance (NMR) data cited are determined with a Varian Associates 60-mc. Spectrometer, Model A-60. The selected chemical shifts given are in parts per million (p.p.m.) relative to tetramethylsilane.

EXAMPLE 1

Preparation of 2-(o-hydroxyphenyl)-4-phenyl-quinazoline

A mixture of 25.5 parts N-phenyl-2-acetoxy-benzamide and 21 parts phosphorus pentachloride was stirred in 90 parts benzene. The temperature of the mixture rose quickly to 40° C., while hydrogen chloride was evolved. The mixture was then heated one hr. at 85° C. and filtered hot. The filtrate was evaporated to dryness under vacuum until benzene and the last traces of phosphoryl chloride were removed. The residue was an oil which by infrared spectrum showed peaks indicative of the phenyl ester linkage (5.65$\mu$) and the imidoyl chloride grouping (6.0$\mu$, 6.28$\mu$ and 6.5$\mu$).

To this oil, dissolved in 101 parts benzonitrile, 13.3 parts anhydrous aluminum chloride were added. The mixture was stirred with heating at 140°–150° C. for 45 minutes. During this time hydrogen chloride evolved. The reaction mixture was then vacuum distilled until excess benzonitrile was stripped.

100 parts 20% aqueous sodium hydroxide solution was added to the stripped material. The aqueous solution was filtered. The filtrate was extracted with ethyl ether and the extract was dried to obtain yellow solids. These solids, combined with solids from the aqueous filtration, were dissolved in ethanol, clarified with activated carbon and crystallized. The crystallized 2-(o-hydroxyphenyl)-4-phenyl-quinazoline was pale yellow and melted at 168°–170° C.

EXAMPLE 2

Preparation of 2-(o-hydroxyphenyl) 4-phenyl-quinazoline

The procedure of Example 1 was followed except that 39.5 parts thionyl chloride was substituted for the phosphorus pentachloride and the isolation procedure to recover the quinazoline product from the reacted mass was altered.

50% aqueous sodium hydroxide solution was added to the reacted mass until the mass had a pH of 11, the mass was stirred ten minutes. The mass was filtered through glass cloth. The filter cake was washed with 1% sodium hydroxide solution, then with hot water. The filter cake was dissolved in acetone, the solution was clarified and dried, and the dry material was crystallized from ethanol. The product was identical to that of Example 1 showing a melting point of 168–170° C.

EXAMPLE 3

Preparation of 2-(o-hydroxyphenyl)-4-phenyl-quinazoline

In a moisture-protected stirred reaction vessel 4.2 parts salicylanilide and 4.16 parts phosphorus pentachloride were slurried in 90 parts benzene and then heated at 80° C. until the evolution of hydrogen chloride ceased. The reacted mixture was then distilled at 25 mm. Hg until the benzene and resulting phosphoryl chloride were removed. The residual N-phenyl-salicylimidoyl chloride was a yellow oil.

This oil was stirred with 101 parts benzonitrile. 2.3 parts anhydrous aluminum chloride were added and the mixture, after a temperature kick to 50° C., was heated. At 110° C. hydrogen chloride gas evolved from the reaction. At 150° C. gas evolution was steady and copious. Heating and stirring continued two hours at 150° C. The reaction mass was cooled and made basic (to pH 8) by the addition of aqueous potassium hydroxide. The mixture was steam distilled, causing a light yellow solid to precipitate. The solid was filtered off and twice recrystallized in ethyl alcohol containing 5% benzene. 2.6 parts of 2-(o-hydroxyphenyl)-4-phenylquinazoline melting at 170°–171° C. were recovered.

The analysis of the product was as follows:

|   | Percent | |
|---|---|---|
|   | Found | Calcd.[1] |
| C | 80.64 | 80.52 |
| H | 4.91 | 4.73 |
| N | 9.46 | 9.39 |
| O | 5.33 | 5.36 |

[1] As $C_{20}H_{14}ON_2$.

In the NMR spectrum, this compound in deuterochloroform showed a proton-chemical shift at 13.7 p.p.m. for the OH group.

EXAMPLE 4

Preparation of 2-(o-hydroxyphenyl)-4-n-nonyl-quinazoline

In a moisture-protected stirred reaction vessel the imidoylchloride of salicylanilide was prepared as in Example 3.

This oil was stirred with 60 parts nitrobenzene, 3.82 parts capronitrile and 2.6 parts anhydrous aluminum chloride. The mixture was heated at 150° C. and held at that temperature for 2½ hours. Hydrogen chloride evolved during the reaction.

The reacted mass was made basic with potassium hydroxide and steam distilled. The steam distilled residue was an emulsion. The emulsion was extracted with four 35 part portions of diethyl ether, and the ether extract was evaporated. The residue was crystallized from absolute alcohol, yielding crystals which when recrystallized from petroleum ether melted at 76–76.5° C.

Analysis of these crystals gave the following results:

|   | Percent | |
|---|---|---|
|   | Found | Calcd.[1] |
| C | 79.28 | 79.28 |
| H | 8.04 | 8.1 |
| N | 7.80 | 8.04 |
| O | 4.71 | 4.59 |

[1] As $C_{23}H_{28}ON_2$.

By NMR spectrum this compound in carbon tetrachloride solution showed a proton-chemical shift at 13.35 p.p.m. for the OH group, at 1.30 p.p.m. for the $$CH_3(CH_2)_7$$

group and at 3.25 p.p.m. for the $CH_2$ group joined to the quinazoline ring.

EXAMPLE 5

Preparation of 2-(o-hydroxyphenyl)-4-methyl-quinazoline 585 parts phosphorus pentachloride were added during 20 minutes to a mixture of 600 parts salicylanilide and 6500 parts o-dichlorobenzene heated to 60° C. Fumes evolved vigorously from the mass during the addition. After 1.5 hours of stirring the mass was distilled at a pressure of 60 mm. Hg up to a boiling temperature of 140° C. until 2600 parts of distillate was removed and no further phosphorus compounds came over in the distillate.

To the undistilled remainder there was added 197 parts acetonitrile. 380 parts anhydrous aluminum chloride were then added during 60 minutes and the mass was heated seven hours at 100° C.

The mass was steam distilled and the residual suspension was made basic with potassium hydroxide. The suspended material was filtered off, dissolved in toluene and clarified cold. The toluene solution was concentrated, diluted with an equal volume of 95% ethyl alcohol and 5% benzene and then crystallized from this solvent mixture. These crystals recrystallized from a 37% benzene-63% ethyl alcohol mixture melted at 118–119° C.

By NMR spectrum this compound in carbon tetrachloride solution showed a proton-chemical shift at 13.3 p.p.m. for the OH group and at 2.9 p.p.m. for the $CH_3$ group.

EXAMPLE 6

Preparation of 2-(o-hydroxyphenyl)-4-tert.butyl-quinazoline

In a moisture-protected stirred reaction vessel the imidoylchloride of salicylanilide was prepared as in Example 3.

This oil was stirred with 78 parts o-dichlorobenzene, 1.68 parts pivalonitrile and 2.94 parts anhydrous aluminum chloride. The mixture was heated at 145° C. for two hours.

The reacted mass was cooled to 70° C. by ice addition and then steam distilled to remove the o-dichlorobenzene. Solids in the solvent-stripped mixture were separated by filtration. These solids were extracted with ethyl alcohol containing 5% benzene and crystallized from that solvent. Crystals melted at 112–113° C. and had the analysis

|   | Percent | |
|---|---|---|
|   | Found | Calcd.[1] |
| C | 77.15 | 77.6 |
| H | 6.65 | 6.51 |
| N | 9.66 | 10.1 |

[1] As $C_{18}H_{18}ON_2$.

By NMR spectrum this compound in carbon tetrachloride solution showed a proton-chemical shift at 13.3 p.p.m. for the OH group and at 1.23 p.p.m. for CH_3 group.

EXAMPLE 7

Preparation of 2-(2'-hydroxy-3'-methylphenyl)-4-phenyl-6-chloro-quinazoline

In a moisture-protected stirred reaction vessel 252.5 parts N-(p-chlorophenyl)-2-hydroxy-3-methyl-benzamide were suspended in 4650 parts o-dichlorobenzene. While the suspension was heated to 90° C. 202 parts phosphorus pentachloride was gradually added during 1.2 hours. The solution which resulted was then stirred an additional 0.25 hour at 90° C. The reacted mass was subjected to vacuum distillation (with an aspirator) to remove phosphoryl chloride along with solvent until the distillate was free of phosphoryl chloride.

The solution remaining was cooled to 50° C. and to it was added 103 parts benzonitrile, 650 parts o-dichlorobenzene and 133 parts anhydrous aluminum chloride. The mixture was heated at 150° C. for two hours. Hydrogen chloride evolved during the heating. The mass was cooled to 80° C. and 60 parts ice were added.

The o-dichlorobenzene was removed by steam distillation. Aqueous phase was decanted from solids left behind. The solids were then washed twice with 200 part portions of 1% hydrochloric acid. The washed solids were then dewatered in toluene and crystallized from that solvent. The crystals melted at 234–235° C. Their analysis was as follows:

|   | Percent | |
|---|---|---|
|   | Found | Calcd.[1] |
| C | 72.67 | 72.67 |
| H | 4.53 | 4.50 |
| N | 8.01 | 8.09 |
| Cl | 10.28 | 10.20 |

[1] As $C_{21}H_{15}ON_2Cl$.

By NMR spectrum this compound in deuterochloroform solution showed a proton-chemical shift at 13.8 p.p.m. for OH and at 2.37 p.p.m. for $CH_3$.

EXAMPLE 8

Preparation of 2-(o-hydroxyphenyl)-4-phenyl-6-chloroquinazoline

To a solution of 230 parts N-(p-chlorophenyl)-o-hydroxy-benzamide in 3900 parts o-dichlorobenzene 194 parts of phosphorus pentachloride were added at 85° C. during 45 minutes. Phosphoryl chloride, along with some solvent, was removed by distillation of the reacted mixture at 175° C. 109 parts benzonitrile and 130 parts anhydrous aluminum chloride were added at 25° C. and the mixture was heated at 145° C. for three hours, evolving hydrogen chloride. The reacted mixture was cooled to 90° C. and water was added to hydrolyze the aluminum chloride complex therein.

o-Dichlorobenzene was removed by steam distillation. Aqueous phase was decanted from residual solids. Organic material in the solids was dissolved in hot toluene and the solution was clarified with activated carbon. To the resulting solution was added one-third its volume of ethyl alcohol containing 5% benzene. Product crystallized was a yellow solid melting at 212–212.5° C. Analysis of the crystals was as follows:

| | Percent | |
|---|---|---|
| | Found | Calcd.[1] |
| C | 72.26 | 72.2 |
| H | 3.84 | 3.94 |
| N | 8.42 | 8.41 |
| Cl | 10.67 | 10.67 |

[1] As $C_{20}H_{13}ON_2Cl$.

By NMR spectrum this compound in deuterochloroform solution showed a proton-chemical effect at 13.5 p.p.m. for OH.

EXAMPLE 9

Preparation of 2-(o-hydroxyphenyl)-4-(p-methoxyphenyl)-quinazoline 208.2 parts phosphorus pentachloride were added gradually to a mixture of 213.2 parts salicylanilide and 3350 parts o-dichlorobenzene having a temperature of 75° C. Rapid evolution of hydrogen chloride occurred during the addition. o-Dichlorobenzene was then distilled from the mass under vacuum until the pressure was down to 10 mm. Hg at 75° mass temperature.

After cooling the undistilled material to 40° C., 134.1 parts n-anisonitrile and 133.3 parts anhydrous aluminum chloride were added. This solution was stirred at 140° C. for 3.5 hours, cooled to 50° C. and water was added to it. Solvent was removed by steam distillation. Dispersed steam distillation residue was filtered off, azotropically freed of water with boiling toluene and crystallized from solution in toluene. The crystals melted at 174–175° C. and had the following analysis:

| | Percent | |
|---|---|---|
| | Found | Calcd.[1] |
| C | 76.49 | 76.7 |
| H | 5.04 | 4.9 |
| N | 8.47 | 8.53 |

[1] As $C_{21}H_{16}O_2N_2$.

By NMR spectrum this compound in deuterochloroform solution showed a proton-chemical shift at 12.9 p.p.m. for OH and at 3.88 p.p.m. for $CH_3O$.

EXAMPLE 10

Preparation of 2-(o-hydroxyphenyl)-4-phenyl-6-methoxy-quinazoline 190 parts phosphorus pentachloride were added during 30 minutes to a solution of 221.5 parts salicyl(p-anisidide) in 3350 parts o-dichlorobenzene having a temperature of 75° C. Vigorous gas evolution from the mass occurred during the addition. Phosphorus compounds were then removed by azeotropic vacuum distillation from the mass until it had a temperature of 110° C. at 10 mm. Hg. The undistilled mass was then cooled to 40° C.

91 parts benzonitrile and 120 parts anhydrous aluminum chloride were added. The mixture was stirred eight hours at 150° C., was cooled, diluted with water and steam distilled to remove solvent. Dispersed solids in the steam distillation residue were filtered off, freed of water by azeotropic distillation with boiling toluene and crystallized from toluene. The product, melting at 148–149° C., had the following analysis:

| | Percent | |
|---|---|---|
| | Found | Calcd.[1] |
| C | 76.51 | 76.7 |
| H | 4.84 | 4.9 |
| N | 8.34 | 8.53 |

[1] As $C_{21}H_{16}O_2N_2$.

By NMR spectrum this compound in deuterochloroform solution showed a proton-chemical shift at 13.5 p.p.m. for OH.

EXAMPLE 11

Preparation of 2-(o-hydroxyphenyl)-4-isopropenyl-quinazoline

In a moisture-protected stirred reaction vessel the imidoylchloride from salicylanilide was prepared as in Example 3 except that the benzene used was replaced by 221 parts monochlorobenzene (MCB) and after reaction 45 parts of phosphoryl chloride-MCB were removed by distillation.

To the solution remaining behind there were added 2.66 parts anhydrous aluminum chloride and 1.35 parts methacrylonitrile. The solution changed color from yellow to red and the temperature rose about 5°. This mixture was then stirred with heating for 5 hours at 110° C. The charge was then steam distilled to remove the MCB, and an oily brown residue remained behind in the aqueous phase. The residue solidified on cooling and the aqueous phase was decanted. The aqueous phase and the solids were each extracted with chloroform and the combined extracts were dried. An oily residue remained. This was crystallized from 6 parts alcohol, producing yellow solids melting 133–135° C. These solids had a nuclear magnetic resonance spectrum indicating the presence of hydroxyl group at 13.2 p.pm., $CH_3$ at 2.34 p.p.m. and $CH_2$ at 5.38 p.p.m. and at 5.73 p.p.m.

The analysis of the solids was as follows:

| | Percent | |
|---|---|---|
| | Found | Calcd.[1] |
| C | 76.50 | 77.84 |
| H | 5.15 | 5.38 |
| N | 10.76 | 10.68 |

[1] As $C_{17}H_{14}ON_2$.

EXAMPLE 12

Preparation of 2-(o-hydroxyphenyl)-4-o-methoxyphenyl)-quinazoline

A solution of imidoylchloride in 442 parts MCB obtained from reaction of 47 parts salicylanilide and 47 parts phosphorus pentachloride was mixed with 30 parts anhydrous aluminum chloride and 30 parts o-methoxybenzonitrile. The mixture was heated 3 hours at 100° C. Hydrolyzing water was added to the mixture and the MCB was removed by steam distillation. Yellow solids were left behind. The solids were azeotropically dried in toluene and then crystallized. Recrystallized solids from half-and-half toluene-isopropyl alcohol melted at 195–196.5° C. These solids had the following analysis:

| | Percent | |
|---|---|---|
| | Found | Calcd.[1] |
| C | 75.94 | 76.7 |
| H | 4.93 | 4.91 |
| N | 8.18 | 8.53 |

[1] As $C_{21}H_{16}O_2N_2$.

By NMR spectrum this compound in deuterochloroform solution showed a proton-chemical shift at 11.1 p.p.m. for OH and at 3.72 p.p.m. for $CH_3O$.

EXAMPLE 13

Preparation of 2-(o-hydroxyphenyl)-4-tert.butyl-6-methoxy-quinazoline

A solution in 232 parts monochlorobenzene (MCB) of imidoylchloride derived from reaction of 25.3 parts salicylanisidide and 20.7 parts phosphorus pentachloride and MCB/$POCl_3$ azeotrope removal was prepared. 13.3 parts anhydrous aluminum chloride and 8.3 parts pivalonitrile were added and the mixture was heated for 3 hours at temperatures up to 130° C. The mixture was hydrolyzed by water addition and the MCB was removed by steam distillation. Aqueous phase was decanted from solids left behind. The solids were azeotropically dried in toluene solution, decolorized, filtered and the toluene was removed. The solid was then crystallized from ethyl alcohol containing 5% benzene. The crystalline product melted at 131–132° C. These gave the following analysis:

|   | Percent Found | Calcd.[1] |
|---|---|---|
| C | 73.52 | 73.91 |
| H | 6.66 | 6.53 |
| N | 8.82 | 9.08 |

[1] As $C_{19}H_{20}O_2N_2$.

By NMR spectrum this compound in carbon tetrachloride solution showed a proton-chemical shift at 13.3 p.p.m. for OH and at 1.23 p.p.m. for $CH_3$.

EXAMPLE 14

Zinc chloride as catalyst 20.9 parts phosphorus pentachloride were added during 20 minutes to a solution of 24.3 parts N-(p-methoxyphenyl)-o-hydroxybenzamide in 65 parts o-dichlorobenzene. The mass was then heated to 110° C. without the occurrence of any distillation.

The mass was cooled to 30° C. 14.4 parts anhydrous zinc chloride and 11.1 parts benzonitrile were added. The charge was heated at 110° C. for three hours. The reacted mass was hydrolyzed by adding water to the cooled mass and then it was steam distilled to remove reaction diluent and unreacted benzonitrile. The residual solids were filtered from the aqueous phase left behind and recrystallized from toluene. The crystals were identified as being 2-(o-hydroxyphenyl)-4-phenyl-6-methoxy-quinazoline.

EXAMPLE 15

Simplified process using AlCl₃ catalyst 20.4 parts phosphorus pentachloride in 55 parts chlorobenzene were added during 20 minutes to a solution of 24.4 parts N-(p-methoxyphenyl)-o-hydroxybenzamide in 275 parts chlorobenzene.

16.2 parts benzonitrile and 13.3 parts anhydrous aluminum chloride were added and the charge was heated at 100° C. for one hour. The reacted mass was cooled, hydrolyzed by water addition and then steam distilled.

Residual solids were filtered from the residual aqueous phase, extracted with toluene, dried and recrystallized from 50–50 toluene-isopropanol to crystallize material identified by mixed melting point as 2-(o-hydroxyphenyl)-4-phenyl-6-methoxy-quinazoline.

EXAMPLE 16

Antimony pentachloride as catalyst

The procedure of Example 15 was followed except that 30.4 parts anhydrous antimony pentachloride replaced the aluminum chloride and only 10.1 parts benzonitrile were used. An identical product was obtained.

EXAMPLE 17

Use of stannic chloride as catalyst

The procedure of Example 15 was followed except that 26.8 parts anhydrous stannic chloride replaced the aluminum chloride and only 10.1 parts benzonitrile were used. An identical product was obtained.

EXAMPLE 18

(A) Particulate 2-(o-hydroxyphenyl)-4-methyl-quinazoline in an amount required to impart an initial optical density (O.D.) in the 1–1.5 range to the final composition is mixed with one part of particulate commercial film-forming polyacrylonitrile (consisting essentially of a copolymer of 93.6 parts acrylonitrile, 6 parts methyl acrylate and 0.4 part sodium p-styrene sulfonate) and 5 parts of dimethylformamide are heated at about 100° C. for a few minutes to form a clear solution, which is poured on a clean, glass plate and spread with a doctor knife having a 16 mil clearance. The dimethylformamide is evaporated by heating such plate in a vacuum oven (60° C./about 100 mm. Hg pressure) for two hours, to give the final film, 1–1.3 mils thick.

(B) The procedure of (A) is followed using 2-(o-hydroxyphenyl)-4-phenyl-quinazoline in place of 2-(o-hydroxyphenyl)-4-methyl-quinazoline.

(C) Particulate 2-(o-hydroxyphenyl)-4-methyl-quinazoline is intimately dry blended with a powdered commercial nylon 66 (hexamethylene diamine/adipic acid condensation polymer), the amounts being adjusted to provide an optical density of 1–1.5 in the final film. The blend is preheated at 270° C. for 0.5 minute and then pressure molded between platens in a Carver press, which develops about 8000 lbs. total pressure in about 2 seconds, whereupon cooling water is circulated through the press platens to cool the resulting substantially clear, about 1–1.5 mils thick, film.

(D) The procedure of (C) is followed using 2-(o-hydroxyphenyl)-4-phenyl-quinazoline in place of 2-(o-hydroxyphenyl)-4-methyl-quinazoline.

A convenient measure of a compound's photostability is the inverse of the quantum yield ($\phi_R^{-1}$) of its photochemical reactions, either through self-degradation or reaction with its surroundings. Thus, $\phi_R^{-1}$ represents the average number of times a photo-activatible, i.e., light-absorbing molecule, must be photo-activated before it reacts to produce inactive products. In other words (since the number of photo-excited molecules equals the number of quanta absorbed), $\phi_R^{-1}$ is the ratio of the number of quanta absorbed to the number of molecules that have undergone photo-chemical reaction.

In this method, the photo-stabilizer candidate contained in a suitable substrate as described above is exposed to radiation from a standard Xenon arc lamp such that the emitted radiation from a standard Xenon arc lamp first passes through a Corning 0–54 filter to filter out wavelengths below 295 mu and through a 10 cm. thick water barrier to remove infrared before it strikes the sample. The extinction coefficient (E) of the test sample's longest wavelength absorption peak and the optical density are determined in the usual way using a Cary spectrophotometer.

The number of quana absorbed is determined with a calibrated 935 photoelectric cell (a series of quartz diffusion discs disposed along the length of a polished cylinder to diminish directional sensitivity and connected to a microammeter) by measuring the intensities of the radiation that strikes the film surface $I_o$ and that passes through the film $I_t$. The current difference $I_o-I_t$ is directly related to the total quanta absorbed and thus is useful per se for comparing compounds The actual quanta absorbed per unit substrate volume per unit time is $k(I_o-I_t)$, where $k$ is a constant, $1.74 \times 10^{16}$ quanta/cm.²/hr., determined by calibrating the cell against a uranyl oxalate actinometer according to known techniques.

$I_o$, $I_t$ and O.D. (optical density) reading at the longest wavelength absorption peak are taken periodically until the optical density has decreased 10–15%, which generally requires from 100 to 1000 hours depending on the composition under test.

The number of molecules photolyzed is determined from the rate at which the optical density decreases with exposure time. This correlation is operative here because the compounds involved degrade to products which are optically inactive in the region of the monitored peak, as indicated by the fact that the peak's optical density decreases linearly with time and its wavelength remains unchanged during the indicated period.

The photostability is calculated as follows:

$$\phi_R^{-1} = 0.0286 \, [(I_o - I_t) \cdot E]/(\Delta O.D./\Delta t),$$

where $I_o$ = the incident light intensity,
$I_t$ = the transmitted light intensity,
E = the extinction coefficient of the photostabilizer, O.D./$d \cdot c$, where O.D. = optical density, $d$ = sample thickness in centimeters, and $c$ = compound concentration in moles/liter, O.D. (optical density) = $\log I_o/I_t$, O.D./$\Delta t$ = how optical density at peak absorption changes with time, or the slope, $a$, of the linear curve, O.D. = $a \cdot t + b$, where $t$ is the time in hours and $b$ the optical density at time zero, and
0.0286 = a composite constant including the cell calibration constant described above.

$\phi_R^{-1}$ is an objective measure of the photostability of a compound. It takes into account the decrease in optical density with time, the broadness of the absorption spectrum $(I_o - I_t)$, and the intensity of absorption (E). The smaller the decrease in optical density with time, the longer the UV screener will last and the longer the protection to the substrate. The broader the absorption band and the higher the extinction coefficient, the smaller is the amount of UV screener to provide a given optical density (optical densities of 1–2 correspond to 90–99% absorption). Good photostability ($\phi_R^{-1}$) values are in order of at least about 10,000.

If equal amounts of two UV screeners having roughly equal absorption characteristics (and molecular weights) are added to a substrate and if $\phi_R^{-1}$ of one compound is ten times that of the other, then the first compound will afford protection for a period of time ten times longer.

The photostability of each of the above samples was as follows:

| Sample | Photostability ×10⁻⁵ | |
|---|---|---|
| | Polyacrylonitrile substrate | Nylon substrate |
| A | 56 | |
| B | 98 | |
| C | | 71 |
| D | | 105 |

EXAMPLE 19

UV-screening polyvinylfluoride film

A polyvinylfluoride organosol containing 1% 2-(o-hydroxyphenyl)-4-methyl-quinazoline based on the polyvinylfluoride was prepared by the procedure described in U.S. 2,953,818 by mixing the quinazoline with a mixture containing 40% polyvinylfluoride in N,N-dimethylacetamide.

The organosol was cast on a ferrotype plate and briefly heated under infrared irradiation to coalesce the composition into a self-supporting partially dried gel film. The gel film was placed in a frame (to prevent relaxation and to induce biaxial orientation during subsequent drying by heating), then heated at 185° C. for 2 to 3 minutes under a high velocity air stream to evaporate the residual dimethylacetamide solvent and provide a clear transparent film.

After being exposed in a standard weathering machine sold as an Atlas Sunshine Arc Weathero-Meter Model XW–R, wherein the sample was subjected to a complex environment which included heat, ultraviolet light, visible light and moisture, this film exhibited outstanding retention of its ultraviolet light screening properties, and thus was suitable to protect coated surfaces and packaged materials from ultraviolet radiation.

EXAMPLE 20

Photostabilized automotive lacquer

Each of 3 batches of lacquer was prepared by blending 28.5 parts poly(methylmethacrylate) having 1.17 relative viscosity (0.5% solution in ethylene dichloride) and a 105° C. glass transition temperature, 28.5 parts methyl methacrylate/butyl acrylate 82/18 copolymer having a 1.17 relative viscosity (0.5% in ethylene dichloride) and a 61° C. glass transition temperature, 20 parts cellulose acetate butyrate (20 second viscosity), 23 parts alkyd resin plasticizer (0.41 coconut oil/2.93 ethylene glycol/2.43 phthalic anhydride, acid number 6–8), in 70/30 toluene/acetone solution with the amounts specified below of 2-(o-hydroxyphenyl)-4-phenyl-quinazoline (OHPPQ) and additional alkyd resin plasticizer described above.

These lacquers were reduced with equal volumes of industrial lacquer thinner, sprayed on conventionally primed auto body panels, then baked for 30 minutes at 300° F. to films of the thickness given. Resistance of the coatings to photodegradation was determined by exposure to accelerated weathering conditions in a Weathero-Meter, described in Example 19. The results are expressed below in terms of 20° gloss (the higher the rating the better).

| Designation | Parts added OHPPQ | Parts added plasticizer | Film thickness, mils | 20-degree gloss— | | |
|---|---|---|---|---|---|---|
| | | | | Initial | 600 hr. | 800 hr. |
| A | | 1.0 | 2.3 | 79.5 | 24 | 9 |
| B | 0.33 | 0.67 | 2.1 | 79.5 | 44 | 25 |
| C | 1.00 | | 2.55 | 79.0 | 45 | 41 |

It can be seen that the addition of OHPPQ extended the useful life of this automotive lacquer.

EXAMPLE 21

Light-stabilized polystyrene

Powdered polystyrene and 0.4% wt. of powdered 2-(o-hydroxyphenyl)-4-nonylquinazoline in one run and 2-(o-hydroxyphenyl)-4-heptadecylquinazoline in a second run were dry-mixed and extruded at 213° C. to form substantially white sheets 2.5 inches by 10 mils thick, useful as indoor fluorescent light diffusers showing high resistance to yellowing.

EXAMPLE 22

Light-stabilized high temp. polyamide

A fiber-spinning solution containing 18% wt. metaphenylene isophthalamide in N,N-dimethylacetamide was diluted with sufficient N,N-dimethylacetamide containing 2-(o-hydroxyphenyl) - 4 - phenyl-6-chloroquinazoline to form a solution containing 10% wt. of the polyamide and 0.2% wt. of the quinazoline.

The solution could be spun into fibers or cast as films to give polyamide fibers and films having high resistance to discoloration by light.

As stated above, the hydroxyarylquinazolines of this invention are UV-absorbers that rapidly and efficiently dissipate such normally destructive energy through nondegradative processes. They are thus useful as light screens and photostabilizers in or on liquid or solid organic materials normally prone to deteriorate in unfiltered sunlight or other light containing UV components. One important substrate class includes resinous and polymeric materials which may be natural or synthetic, as films, sheets, fibers, textiles or other forms presenting a surface subject to light exposure, in particular cellulosics such as cellulose acetate and cellophane, condensation polymers such as polyamides (nylon type), polyacetals (polyvinyl butyral resins), polyesters (e.g., polyethylene-terephthalate "Mylar" polyester film), and polyurethanes and addition polymers and copolymers of ethylene, propylene, butadiene, chloroprene, styrene, acrylonitrile, vinyl chloride, vinyl fluoride, vinylidene fluoride, alkyl acrylate, alkyl methacrylate and mixtures thereof.

The UV-sensitive materials to be protected may be contained within or located under UV-transparent materials, which themselves may or may not be prone to photodegradation. For example, dyes and pigments in polyolefins, poly acrylates and poly acetals, may thus be protected by incorporating therewith hydroxyaryl quinazolines. Similarly the light fastness of dyes and pigments which have been melt-incorporated into or applied on fibers, e.g. polyamides, can also be improved in this way. The hydroxyaryl quinazolines may likewise be melt-incorporated into the fiber during its manufacture or co-applied with the dye in the textile finishing mill dyeing step.

Light-sensitive commodities like cosmetics or foods, e.g. milk, beer, potato chips, luncheon meats, bacon and other meats, dried fruits, frozen peas, beans and other vegetables, may be protected against discoloration, vitamin deterioration and light-catalyzed oxidative degradations by packaging these products in film packaging materials, e.g. polyolefins and cellophanes, containing hydroxyaryl quinazolines either as part of the film composition or coated thereon to screen out the harmful rays.

Outdoor paints, coatings or other surfaces may also be protected against photodegradation by incorporating therewith or overcoating with films or other coatings containing hydroxyaryl quinazoline light screeners. Thus pigmented building sidings coated with protective polyvinyl fluoride films containing light screeners of this invention are exceptionally stable to weathering and the effects of light. The light screeners may also be used in clear wood coatings, such as oil modified polyurethane, tung-oil phenolic spar varnish, exterior alkyds and nitrocellulose coatings, to protect both the coating and the wood from darkening and deteriorating.

Adhesives and other bonding agents used in outdoor applications (for example acrylic, epoxy and polyester adhesive resins described and referred to by Tocker) and prone to light degradation can likewise be protected by the UV screeners of this invention.

In a particular use embodiment the hydroxyaryl quinazolines of this invention are incorporated as UV screens in acrylic coating compositions, particularly useful as automotive lacquers. Desirable coating compositions broadly comprise (A) from 5 to 95 parts by weight of at least one polymer which is either (1) a poly($C_1$–$C_3$ alkyl methacrylate) or (2) a poly($C_1$–$C_{20}$ alkyl acrylate), a poly($C_2$–$C_{18}$ alkyl methacrylate), polystyrene or a mixture thereof and (B) from 95 to 5 parts by weight of at least one copolymer of methyl methacrylate with a $C_1$–$C_{10}$ alkyl acrylate, a $C_4$–$C_{18}$ alkyl methacrylate or a mixture thereof, components (A) and (B) having glass transition temperatures which differ from each other by at least 30° C. The coating composition is normally carried in a carrier solvent and may contain other desirable and compatible automotive lacquer components such as plasticizers, pigments and a binder such as cellulose acetate butyrate. A typical lacquer comprises (A) at least 30% by weight of the film-forming A and B components combined, of poly(methyl methacrylate) having a 1.10–1.25 relative viscosity (0.5% solution in ethylene dichloride), (B) at least 30%, by weight of A and B combined, of a methyl methacrylate/butyl acrylate 82/18 copolymer having a 1.10–1.25 relative viscosity, and (C) up to 20%, by weight of the solids in the composition of a compatible plasticizer, such as dibutyl phthalate, bis(methylcyclohexyl) phthalate, butyl benzyl phthalate, tributyl phthalate, polyester plasticizers and alkyd resins. Such coating compositions are more fully described by W. S. Zimmt, South African Pat. 6,957/67.

The concentration of the photostabilizer in the substrate will normally vary with the particular stabilizer and its effectiveness, the substrate to be protected and its susceptibility to photodegradation and the effect desired. It is usually desirable to employ sufficient of the stabilizer to screen substantially all the potentially harmful radiation. In general, concentrations providing optical densities of from 1 to 2 correspond to 90% or more absorption of the incident light. Typical amounts for screening 90% or more of the light are from .05 to 5% by weight based on the substrate.

The hydroxyaryl quinazolines may also be advantageously employed with other additives normally employed to protect the various particular substrates described above against oxidative, thermal and other degradative processes. Included among such co-additives are phenolic antioxidants, salicylate thermal stabilizers, triaryl, phosphoramides, nickel alkyl carbamates, nickel phenolates and dilauryl thiodipropionate. They may also be used with pigments, fillers, plasticizers and other light absorbers if desired as long as these additives do not detract from their effectiveness for the purposes of this invention.

The foregoing detailed description has been given for clearness of understanding only and no unnecessary limitations are to be understood therefrom. The invention is not limited to the exact details shown and described, for obvious modifications will occur to those skilled in the art.

What is claimed is:

1. A process for producing a 2-(o-hydroxyphenyl) quinazoline of the formula

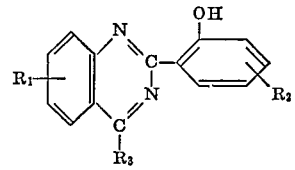

which comprises reacting an organic nitrile compound of the formula $R_3CN$ with an N-phenyl-o-oxybenzimidoyl chloride of the formula

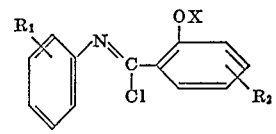

wherein $R_1$ is selected from the group consisting of hydrogen, halogen, alkyl of 1 to 16 carbon atoms, cycloalkyl, halogen substituted alkyl of 1 to 16 carbon atoms, halogen substituted cycloalkyl and alkoxy of 1 to 16 carbon atoms; $R_2$ is selected from the group consisting of hydrogen, alkyl of 1 to 16 carbon atoms, cycloalkyl, halogen substituted cycloalkyl and halogen substituted alkyl of 1 to 16 carbon atoms; $R_3$ is selected from the group consisting of hydrocarbyl and substituted hydrocarbyl having substituents selected from the group consisting of halogen and alkoxy of 1–6 carbon atoms, said cycloalkyl groups being selected from cyclopentyl, cyclohexyl and cycloheptyl and said hydrocarbyl groups being selected from $C_{1-9}$ alkyl, alkenyl up to 9 carbon atoms, cyclopentyl, cycloheptyl, p-methylcyclohexyl, p-hexylcyclohexyl, p-decylcyclohexyl, phenyl substituted methyl, phenyl methylphenyl, dimethylphenyl, p-hexylphenyl and decylphenyl, and X is selected from the group consisting of hydrogen and alkanoyl of 2 to 4 carbon atoms in the presence of a Friedel-Crafts catalyst at a temperature of from about 90 to about 160° C. followed by hydrolyzing the reaction product and recovering 2-(o-hydroxyphenyl) quinazoline.

2. The process of claim 1 wherein the N-phenyl-o-oxybenzimidoyl chloride comprises the reaction product of an N-phenyl-2-oxybenzamide of the formula

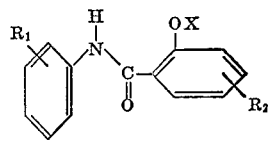

wherein $R_1$, $R_2$ and X are as defined in claim 1 with a compound selected from the group consisting of thionyl chloride and phosphorus pentachloride.

3. The process of claim 1 wherein $R_1$ is chlorine.

4. The process of claim 1 wherein $R_3$ is substituted hydrocarbyl having alkoxy substituent groups of 1 to 6 carbon atoms.

5. The process of claim 1 wherein $R_3$ is a phenyl radical substituted by alkoxy groups of 1 to 4 carbon atoms.

6. The process of claim 1 wherein $R_3$ is an unsubstituted alkyl of from 1 to 9 carbon atoms.

7. The process of claim 1 wherein the temperature is 100° to 110° C.

8. The process of claim 1 wherein the N-phenyl-o-oxybenzimidoyl chloride and $R_3CN$ is reacted in equimolar proportions.

9. The process of claim 1 wherein an organic diluent inert to the reaction is present.

10. The process of claim 1 wherein N-phenyl-2-hydroxybenzimidoyl chloride is reacted with benzonitrile.

11. The process of claim 1 wherein the Friedel-Crafts catalyst is anhydrous aluminum chloride.

12. The process of claim 1 wherein N-(4'-methoxyphenyl)-o-hydroxybenzimidoyl chloride is reacted with benzonitrile.

13. The process of claim 1 wherein X is H.

References Cited

FOREIGN PATENTS 1,074,047   1/1960   Germany.
1,109,180   6/1961   Germany.

OTHER REFERENCES

Meerwein et al.: Berichte 89, 224–231 (1956).

NICHOLAS S. RIZZO, Primary Examiner

R. V. RUSH, Assistant Examiner

U.S. Cl. X.R.

260—482 R, 543 R, 558 R, 559 S

PO-1050
(5/69)

UNITED STATES PATENT OFFICE
CERTIFICATE OF CORRECTION

Patent No. 3,772,274            Dated 11/13/73

Inventor(s) Ralph Benjamin Kaplan

It is certified that error appears in the above-identified patent and that said Letters Patent are hereby corrected as shown below:

In column 16, line 57, "cycloheptyl" should be -- cyclohexyl --; line 59, insert a comma after "yl".

Signed and sealed this 2nd day of April 1974.

(SEAL)
Attest:

EDWARD M.FLETCHER,JR.
Attesting Officer

C. MARSHALL DANN
Commissioner of Patents